United States Patent
Zhou et al.

(10) Patent No.: US 12,267,764 B2
(45) Date of Patent: *Apr. 1, 2025

(54) USER EQUIPMENT, METHOD FOR CONTROLLING THE SAME AND NETWORK SIDE DEVICE

(71) Applicant: SPREADTRUM COMMUNICATIONS (SHANGHAI) CO., LTD., Shanghai (CN)

(72) Inventors: Huayu Zhou, Shanghai (CN); Hualei Wang, Shanghai (CN); Weijie Xu, Shanghai (CN); Yang Liu, Shanghai (CN); Yanan Jia, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 125 days.

This patent is subject to a terminal disclaimer.

(21) Appl. No.: 18/164,004

(22) Filed: Feb. 3, 2023

(65) Prior Publication Data
US 2023/0189125 A1 Jun. 15, 2023

Related U.S. Application Data

(63) Continuation of application No. 16/910,596, filed on Jun. 24, 2020, now Pat. No. 11,601,868, which is a
(Continued)

(30) Foreign Application Priority Data

May 9, 2016 (CN) .......................... 201610302102.8

(51) Int. Cl.
*H04W 88/08* (2009.01)
*H04L 5/00* (2006.01)
(Continued)

(52) U.S. Cl.
CPC ........... *H04W 48/10* (2013.01); *H04L 5/0005* (2013.01); *H04L 5/0007* (2013.01);
(Continued)

(58) Field of Classification Search
USPC ......................................................... 370/329
See application file for complete search history.

(56) References Cited

U.S. PATENT DOCUMENTS 10,187,169 B2 1/2019 Sadiq et al.
10,736,017 B2 8/2020 Zhou et al.
(Continued)

FOREIGN PATENT DOCUMENTS

CN 1533196 A 9/2004
CN 102196359 A 9/2011
(Continued)

OTHER PUBLICATIONS

SIPO Second Office Action corresponding to Application No. 201610302102.8; Dated Dec. 3, 2018.
(Continued)

*Primary Examiner* — Maharishi V Khirodhar
(74) *Attorney, Agent, or Firm* — CANTOR COLBURN LLP

(57) ABSTRACT

A user equipment, a method for controlling the user equipment, and a network side device are provided in the present disclosure. The method includes transmitting broadcast-type signals and channels to the user equipment through a dedicated resource unit so that the user equipment can access a network; wherein the dedicated resource unit is only configured to transmit the broadcast-type signals and channels and is continuous in a frequency domain and a time domain. The present disclosure can control the user equipment to access the network.

20 Claims, 5 Drawing Sheets

Related U.S. Application Data continuation of application No. 15/453,110, filed on Mar. 8, 2017, now Pat. No. 10,736,017.

(51) Int. Cl.

| | | |
|---|---|---|
| *H04L 27/26* | (2006.01) | |
| *H04W 48/10* | (2009.01) | |
| *H04W 72/044* | (2023.01) | |
| *H04W 76/00* | (2018.01) | |
| *H04W 72/51* | (2023.01) | |

(52) U.S. Cl.
CPC .......... *H04L 5/0039* (2013.01); *H04L 5/0048* (2013.01); *H04L 5/005* (2013.01); *H04L 5/0053* (2013.01); *H04L 27/2602* (2013.01); *H04W 72/044* (2013.01); *H04W 72/51* (2023.01)

(56) References Cited

U.S. PATENT DOCUMENTS

| | | | |
|---|---|---|---|
| 2008/0273582 A1* | 11/2008 | Gaal | H04L 25/0226 375/224 |
| 2012/0314591 A1* | 12/2012 | Zhang | H04L 27/266 370/252 |
| 2013/0083749 A1 | 4/2013 | Xu et al. | |
| 2013/0114525 A1* | 5/2013 | Ahmadi | H04L 5/0094 370/329 |
| 2013/0322363 A1 | 12/2013 | Chen et al. | |
| 2014/0198685 A1* | 7/2014 | Xu | H04W 48/10 370/254 |
| 2014/0241185 A1 | 8/2014 | Yanover et al. | |
| 2015/0092690 A1* | 4/2015 | Seo | H04L 5/0048 370/329 |
| 2015/0181570 A1 | 6/2015 | Sorrentino et al. | |
| 2015/0229342 A1* | 8/2015 | Furuskog | H04L 5/0053 370/329 |
| 2015/0296514 A1* | 10/2015 | Morioka | H04L 5/0098 370/329 |
| 2015/0312347 A1 | 10/2015 | Yun | |
| 2016/0127098 A1 | 5/2016 | Ng et al. | |
| 2016/0212737 A1 | 7/2016 | Jang et al. | |
| 2016/0227345 A1 | 8/2016 | Xu et al. | |
| 2017/0111913 A1 | 4/2017 | Li et al. | |
| 2017/0245278 A1* | 8/2017 | Xue | H04W 56/001 |
| 2017/0290017 A1 | 10/2017 | Takeda et al. | |
| 2017/0325155 A1 | 11/2017 | Zhou et al. | |
| 2018/0054289 A1* | 2/2018 | Kim | H04L 5/0053 |
| 2018/0152269 A1* | 5/2018 | Xiong | H04L 5/0053 |
| 2018/0279388 A1* | 9/2018 | Miao | H04W 72/04 |
| 2019/0007932 A1 | 1/2019 | Chen et al. | |
| 2019/0090218 A1 | 3/2019 | Noh et al. | |
| 2020/0322874 A1 | 10/2020 | Zhou | |

FOREIGN PATENT DOCUMENTS

| | | |
|---|---|---|
| CN | 103024834 A | 4/2013 |
| CN | 201610018654.6 | 1/2016 |
| WO | 2015050339 A1 | 4/2015 |

OTHER PUBLICATIONS

Summary of the First SIPO Office Action corresponding to Application No. 201610302102.8; Issue date of May 2, 2018.

Sun, Guoliang,. "Research on 4g cell search process and algorithm," Shanghai Chensi Electronic Technology Co., Ltd. 2012, pp. 61-62.

USPTO Final Rejection for corresponding U.S. Appl. No. 15/453,110; issued on Jan. 13, 2020.

USPTO Final Rejection for corresponding U.S. Appl. No. 15/453,110; Issued on Jan. 30, 2019.

USPTO Final Rejection for corresponding U.S. Appl. No. 16/910,596; Issued on Aug. 8, 2022.

USPTO Non-Final Office Action for corresponding U.S. Appl. No. 15/453,110 issued Aug. 7, 2018.

USPTO Non-Final Rejection for corresponding U.S. Appl. No. 15/453,110; Issued on Sep. 5, 2019.

USPTO Non-Final Rejection for corresponding U.S. Appl. No. 16/910,596; Issued on Feb. 15, 2022.

* cited by examiner

USER EQUIPMENT, METHOD FOR CONTROLLING THE SAME AND NETWORK SIDE DEVICE

CROSS-REFERENCE TO RELATED APPLICATIONS

This application is a Continuation Application of the U.S. patent application Ser. No. 16/910,596 filed on Jun. 24, 2020, which is a Continuation Application of the U.S. patent application Ser. No. 15/453,110 flied on Mar. 8, 2017, and patented as U.S. Pat. No. 10,736,017B2 issued on Aug. 4, 2020, which claims the priority to Chinese Patent Application No. 201610302102.8, filed on May 9, 2016, the entire disclosure of which are incorporated herein.

TECHNICAL FIELD

The present invention relates to communication technology field, and more particularly, to a user equipment, a method for controlling the user equipment, and a network side device.

BACKGROUND

The Fifth Generation (5G) mobile communication technology is a main development trend of the development of a new generation mobile communication technology, and is an important part of a new generation of information infrastructure in the future. Compared with 4G, 5G will not only further improve the user's network experience, but also meet the future applications requirement of Internet of Everything (IoE). From the user's experience, 5G has a higher speed and a wider bandwidth. 5G is expected to be about 10 times faster than 4G, and it will just take a few seconds to download a high-definition movie, and is capable of meeting higher network experience requirements of consumers, such as virtual reality and super high-definition video. From industry application perspective, 5G has a higher reliability, and a lower latency, which can meet the specific needs of industry application such as intelligent manufacturing and automatic driving, broaden development space of convergence industry and support innovation and development of economic society.

5G system divides the whole continuous bandwidth resources into different subbands, in order to meet the requirements of different application scenarios, the different subbands may correspond to different configurations. Therefore, there is a need for a solution to control the user equipment to access network.

SUMMARY

The technical problem solved by the present disclosure includes controlling the user equipment to access network.

A method for controlling a user equipment is provided according to an embodiment of the present invention, including:

transmitting broadcast-type signals and channels to the user equipment through a dedicated resource unit so that the user equipment can access a network; wherein the dedicated resource unit is only configured to transmit the broadcast-type signals and channels, and is continuous in a frequency domain and a time domain.

Optionally, the dedicated resource unit includes a subframe or a transmission time interval in the time domain.

Optionally, a time domain position and a frequency domain position of the dedicated resource unit are a predefined time domain position and a predefined frequency domain position respectively.

Optionally, transmitting the broadcast-type signals and channels to the user equipment includes, transmitting the broadcast-type signals and channels to the user equipment according to a preset basic carrier configuration so that user equipments of different kinds can recognize the broadcast-type signals and channels.

Optionally, the basic carrier configuration includes a subcarrier spacing and a cyclic prefix length.

Optionally, the broadcast-type signals and channels include at least one of a synchronization signal, a broadcast channel and a common control channel.

Optionally, transmitting the broadcast-type signals and channels through the dedicated resource unit includes: transmitting the broadcast channel and/or the common control channel to the user equipment by using a preset broadcast reference signal.

Optionally, transmitting the broadcast-type signals and channels to the user equipment through the dedicated resource unit includes: transmitting the broadcast-type signals and channels repeatedly in a plurality of the dedicated resource unit of different time domain positions and/or different frequency domain positions.

Optionally, the broadcast-type signals and channels include a plurality of signals and/or channels, and the plurality of signals and/or channels located in a same dedicated resource unit are independently encoded and modulated, so that the user equipment can independently demodulate and decode the plurality of signals and/or channels located in the same dedicated resource unit.

Optionally, the broadcast-type signals and channels include a plurality of signals and/or channels, and there is a sequence among the plurality of signals and/or channels located in a same dedicated resource unit in the time domain.

Optionally, the broadcast-type signals and channels include a synchronization signal, a broadcast channel and a common control channel, and the synchronization signal, the broadcast channel and the common control channel are sequentially arranged in the dedicated resource unit in the time domain.

Optionally, the user equipment is an enhanced mobile broadband user equipment, a large-scale machine-type communication user equipment or a high reliability and low latency communication user equipment.

Optionally, the user equipment includes different kinds of user equipment, the different kinds of user equipment correspond to different kinds of broadcast-type signals and channels, and the method further includes: dividing the dedicated resource unit into a plurality of dedicated resource subunits according to the different kinds of user equipment; and transmitting the broadcast-type signals and channels to the user equipment through the dedicated resource unit includes: transmitting the different kinds of broadcast-type signals and channels through the plurality of dedicated resource subunits, wherein each of the plurality of dedicated resource subunits is independently encoded and modulated.

Optionally, the user equipment includes different kinds of user equipment, and the different kinds of user equipment correspond to different kinds of broadcast-type signals and channels, and the different kinds of broadcast-type signals and channels in the dedicated resource unit are encoded and modulated in hybrid.

A method for controlling a user equipment is also provided according to an embodiment of the present disclosure, including:

receiving broadcast-type signals and channels from a network side through a dedicated resource unit; and accessing a network through the broadcast-type signals and channels;

wherein the dedicated resource unit is only configured to transmit the broadcast-type signals and channels, and is continuous in a frequency domain and a time domain.

Optionally, the dedicated resource unit includes a subframe or a transmission time interval in the time domain.

Optionally, a time domain position and a frequency domain position of the dedicated resource unit are a predefined time domain position and a predefined frequency domain position respectively.

Optionally, receiving the broadcast-type signals and channels from the network side through the dedicated resource unit includes: receiving the broadcast-type signals and channels according to a preset basic carrier configuration.

Optionally, the basic carrier configuration includes a subcarrier spacing and a cyclic prefix length.

Optionally, the broadcast-type signals and channels include at least one of a synchronization signal, a broadcast channel and a common control channel.

Optionally, receiving the broadcast-type signals and channels from the network side through the dedicated resource unit includes: receiving the broadcast channel and/or the common control channel by using a preset broadcast reference signal.

Optionally, accessing the network includes using the broadcast reference signal for time and frequency offset tracking and/or channel estimation.

Optionally, receiving the broadcast-type signals and channels from the network side through the dedicated resource unit includes: receiving the broadcast-type signals and channels repeatedly from a plurality of the dedicated resource unit of different time domain positions and/or different frequency domain positions.

Optionally, the broadcast-type signals and channels include a plurality of signals and/or channels, and the plurality of signals and/or channels located in a same dedicated resource unit are independently encoded and modulated, accessing the network through the broadcast-type signals and channels includes demodulating and decoding the plurality of signals and/or channels located in the same dedicated resource unit independently.

Optionally, the broadcast-type signals and channels include a plurality of signals and/or channels, and accessing the network through the broadcast-type signals and channels includes: processing the plurality of signals and/or channels located in a same dedicated resource unit sequentially according to a sequence of the plurality of signals and/or channels located in the same dedicated resource unit in the time domain.

Optionally, the broadcast-type signals and channels include at least one of a synchronization signal, a broadcast channel and a common control channel; and processing the plurality of signals and/or channels located in the same dedicated resource unit sequentially according to the sequence of the plurality of signals and/or channels located in the same dedicated resource unit in the time domain includes:

searching the synchronization signal;

determining configuration of the broadcast channel based on the synchronization signal;

detecting the broadcast channel;

determining configuration of the common control channel according to information of the broadcast channel; and detecting the common control channel.

Optionally, the broadcast-type signals and channels include different kinds of broadcast-type signals and channels to be adapted for at least one equipment selected from a group consisting of an enhanced mobile broadband user equipment, a large-scale machine-type communication user equipment and a high reliability and low latency communication user equipment.

Optionally, the broadcast-type signals and channels include different kinds of broadcast-type signals and channels respectively corresponding to different kinds of user equipment, the dedicated resource unit is divided into a plurality of dedicated resource subunits according to the different kinds of user equipment, the different kinds of broadcast-type signals and channels are transmitted through the plurality of dedicated resource subunits, and each of the plurality of dedicated resource subunits is independently encoded and modulated; and accessing the network through the broadcast-type signals and channels includes decoding and demodulating each of the plurality of dedicated resource subunits independently.

Optionally, the broadcast-type signals and channels include different kinds of broadcast-type signals and channels respectively corresponding to different kinds of user equipment, and the dedicated resource unit performs encoding and modulation in hybrid to the different kinds of broadcast-type signals and channels.

A network side device is also provided according to an embodiment of the present disclosure, including: a transmitting circuitry, configured to transmit broadcast-type signals and channels to a user equipment through a dedicated resource unit so that the user equipment can access a network; wherein the dedicated resource unit is only configured to transmit the broadcast-type signals and channels, and is continuous in a frequency domain and a time domain.

Optionally, the dedicated resource unit includes a subframe or a transmission time interval in the time domain.

Optionally, a time domain position and a frequency domain position of the dedicated resource unit are a predefined time domain position and a predefined frequency domain position respectively.

Optionally, the transmitting circuitry is adapted to transmit the broadcast-type signals and channels to the user equipment in a preset basic carrier configuration so that user equipments of different kinds can recognize the broadcast-type signals and channels.

Optionally, the basic carrier configuration includes: a subcarrier spacing and a cyclic prefix length.

Optionally, the broadcast-type signals and channels include at least one of a synchronization signal, a broadcast channel and a common control channel.

Optionally, the transmitting circuitry is configured to transmit the broadcast channel and/or the common control channel to the user equipment by using a preset broadcast reference signal.

Optionally, the transmitting circuitry is configured to transmit the broadcast-type signals and channels repeatedly in a plurality of the dedicated resource unit of different time domain positions and/or different frequency domain positions.

Optionally, the broadcast-type signals and channels include a plurality of signals and/or channels, and the plurality of signals and/or channels located in a same dedicated resource unit are independently encoded and modulated, so that the user equipment can independently demodulate and decode the plurality of signals and/or channels located in the same dedicated resource unit.

Optionally, the broadcast-type signals and channels include a plurality of signals and/or channels, and there is a sequence among the plurality of signals and/or channels located in a same dedicated resource unit in the time domain.

Optionally, the broadcast-type signals and channels include a synchronization signal, a broadcast channel and a common control channel, and the synchronization signal, the broadcast channel and the common control channel are arranged sequentially in the dedicated resource unit in the time domain.

Optionally, the user equipment is an enhanced mobile broadband user equipment, a large-scale machine-type communication user equipment or a high reliability and low latency communication user equipment.

Optionally, the user equipment includes different kinds of user equipment, the different kinds of user equipment correspond to different kinds of broadcast-type signals and channels, and the network side device further includes: a dedicated resource unit dividing circuitry configured to divide the dedicated resource unit into a plurality of dedicated resource subunits according to the different kinds of user equipment; and the transmitting circuitry is configured to transmit the different kinds of broadcast-type signals and channels through the plurality of dedicated resource subunits, and each of the plurality of dedicated resource subunits is independently encoded and modulated.

Optionally, the user equipment includes different kinds of user equipment, the different kinds of user equipment correspond to different kinds of broadcast-type signals and channels, and the different kinds of broadcast-type signals and channels in the dedicated resource unit are encoded and modulated in hybrid.

A user equipment is also provided according to an embodiment of the present disclosure, including:

a receiving circuitry, configured to receive broadcast-type signals and channels from a network side through a dedicated resource unit; and an accessing circuitry, configured to access a network through the broadcast-type signals and channels;

wherein the dedicated resource unit is only configured to transmit the broadcast-type signals and channels, and is continuous in a frequency domain and a time domain.

Optionally, the dedicated resource unit includes a subframe or a transmission time interval in the time domain.

Optionally, a time domain position and a frequency domain position of the dedicated resource unit are a predefined time domain position and a predefined frequency domain position respectively.

Optionally, the receiving circuitry is configured to receive the broadcast-type signals and channels according to a preset basic carrier configuration.

Optionally, the basic carrier configuration includes a subcarrier spacing and a cyclic prefix length.

Optionally, the broadcast-type signals and channels include at least one of a synchronization signal, a broadcast channel and a common control channel.

Optionally, the receiving circuitry is configured to receive the broadcast channel and/or the common control channel by using a preset broadcast reference signal.

Optionally, the access circuitry is configured to using the broadcast reference signal for time and frequency offset tracking and/or channel estimation.

Optionally, the receiving circuitry is configured to receive the broadcast-type signals and channels repeatedly from a plurality of the dedicated resource unit of different time domain positions and/or different frequency domain positions.

Optionally, the broadcast-type signals and channels include a plurality of signals and/or channels, the plurality of signals and/or channels located in a same dedicated resource unit are independently encoded and modulated, and the accessing circuitry is configured to demodulate and decode the plurality of signals and/or channels located in the same dedicated resource unit independently.

Optionally, the broadcast-type signals and channels include a plurality of signals and/or channels, and the accessing circuitry is configured to process the plurality of signals and/or channels located in a same dedicated resource unit sequentially according to a sequence of the plurality of signals and/or channels located in the same dedicated resource unit in the time domain.

Optionally, the access circuitry includes:

a synchronization signal searching subcircuit, configured to search a synchronization signal;

a broadcast channel configuration determining subcircuit, configured to determine configuration of the broadcast channel based on the synchronization signal;

a broadcast channel detecting subcircuit, configured to detect the broadcast channel;

a common control channel configuration determining subcircuit, configured to determine configuration of the common control channel according to information of the broadcast channel; and a common control channel detecting subcircuit, configured to detect the common control channel.

Optionally, the broadcast-type signals and channels include different kinds of broadcast-type signals and channels to be adapted for at least one equipment selected from a group consisting of an enhanced mobile broadband user equipment, a large-scale machine-type communication user equipment and a high reliability and low latency communication user equipment.

Optionally, the broadcast-type signals and channels include different kinds of broadcast-type signals and channels respectively corresponding to different kinds of user equipment, the dedicated resource units are divided into a plurality of dedicated resource subunits according to the different kinds of user equipment, the different kinds of broadcast-type signals and channels are transmitted through the plurality of dedicated resource subunits, and each of the plurality of dedicated resource subunits is independently encoded and modulated; and the accessing circuitry is configured to decode and demodulate each of the plurality of dedicated resource subunits independently.

Optionally, the broadcast-type signals and channels include different kinds of broadcast-type signals and channels respectively corresponding to different kinds of user equipment, and the dedicated resource unit performs coding and modulation in hybrid to the different kinds of broadcast-type signals and channels.

Compared with the conventional technology, the present disclosure has the following beneficial effects:

By way of transmitting the broadcast-type signals and channels to the user equipment through the dedicated resource unit, the user equipment can perform configuration and blindly detect according to the broadcast-type signals and channels, and further access the network; by way of using the dedicated resource unit, the service data is not mixed with the broadcast-type signals and channels, the service data does not require complicated rate matching which can reduce the system complexity. Since the dedicated resource unit is continuous in the time domain and the frequency domain, the dedicated resource unit is only configured to transmit the broadcast-type signals and channels, and the broadcast-type signals and channels included in each dedicated resource unit can independently support the user equipment to access network, the dedicated resource unit serving as a minimum unit for supporting the user equipment to access network, occupies a narrower frequency band. Therefore, the method in the embodiments of the present disclosure can also be applied to different kinds of user equipment having different bandwidth requirements or limitations.

Further, although the broadcast-type signals and channels included in each dedicated resource unit can independently support the user equipment to access to the network, there may be a certain probability of failure during the user equipment acquiring broadcast-type signals and channels included in the dedicated resource unit, thus the user equipment may have multiple opportunities to acquire the broadcast-type signals and channels by transmitting the broadcast-type signals and channels repeatedly in a plurality of the dedicated resource unit of different time domain positions and/or different frequency domain positions, to ensure the successful access of the user equipment.

Further, when the method in the embodiments of the present disclosure is applied to different kinds of user equipment, the different kinds of user equipment may correspond to different kinds of broadcast-type signals and channels, then the dedicated resource units are divided into a plurality of dedicated resource subunits according to the different kinds of user equipment, and the different kinds of broadcast-type signals and channels are transmitted through the plurality of dedicated resource subunits, and each of the dedicated resource subunits is independently encoded and modulated, therefore the different kinds of user equipment can perform targeted detection, demodulation and decoding, which saves resources of the user equipment and enhances access efficiency.

DETAILED DESCRIPTION

As described above, 5G system divides the whole continuous bandwidth resources into different subbands. In order to meet the requirements of different application scenarios, the different subbands may correspond to different configurations. Thus, there is a need for a solution to control the user equipment to access network.

It is found by the inventors that, in the 5G system, different subbands may be dynamically or semi-statically configured with different carrier numerology, for example, subcarrier spacing, Cyclic Prefix (CP) length etc. to meet the requirements of different application scenarios.

A time-varying subband configuration is not available in the current system, therefore broadcast-type signals and channels need to be redesigned. For example, the user needs to receive the broadcast-type signals and channels at an initial access, while it is difficult for the user equipment to acquire the time-varying subband configuration information at the initial access, thus the broadcast-type signals and channels need to be redesigned.

In embodiments of the present disclosure, transmitting broadcast-type signals and channels to a user equipment through a dedicated resource unit, so that the user equipment can perform configuration and blindly detect according to the broadcast-type signals and channels, and further access the network; by using the dedicated resource unit, the service data is not mixed with the broadcast-type signals and channels, so that the service data does not require complicated rate matching which can reduce the system complexity; since the dedicated resource unit is continuous in the time domain and the frequency domain, the dedicated resource unit is only configured to transmit the broadcast-type signals and channels, and the broadcast-type signals and channels included in each dedicated resource unit can independently support the user equipment to access network, the dedicated resource unit serving as a minimum unit for supporting the user equipment to access network, occupies a narrower frequency band. Therefore, the method in the present disclosure can also be applied to different kinds of user equipment having different bandwidth requirements or limitations.

In order that the above objects, features and advantages of the present invention will become more apparent, specific embodiments of the present invention will be described in detail with reference to the accompanying drawings.

Figure 1:
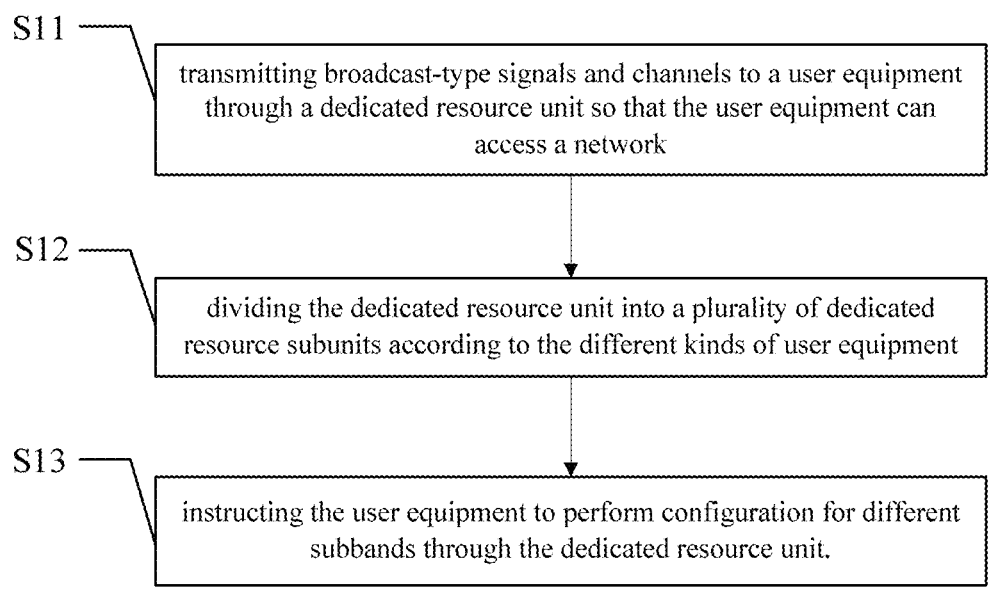
FIG. 1 schematically illustrates a flowchart of a method for controlling a user equipment according to an embodiment of the present disclosure.

FIG. 1 schematically illustrates a flowchart of a method for controlling a user equipment according to an embodiment of the present disclosure. The method for controlling the user equipment shown in FIG. 1 is adapted to a network side and may include:

In step S11, transmitting broadcast-type signals and channels to the user equipment through a dedicated resource unit so that the user equipment can access a network.

Wherein the dedicated resource unit is only configured to transmit the broadcast-type signals and channels, and is continuous in a frequency domain and a time domain.

In some embodiments, the dedicated resource unit is a dedicated resource block which is continuous in the frequency domain and the time domain and can be located in any subband within the bandwidth resource. A time domain position and a frequency domain position may be preset, or configured by the network side as required.

The dedicated resource unit is only configured to transmit the broadcast-type signals and channels, and information included in the broadcast-type signals and channels transmitted by each dedicated resource unit can support the access of the user equipment, thus the dedicated resource unit is a minimum resource unit that can support the user equipment to access the network.

It will be appreciated by those skilled in the art that when a communication system is designed to support different kinds of user equipment, a bandwidth of the dedicated resource unit may be less than or equal to a narrowest bandwidth of a user equipment in the different kinds of user equipment.

The dedicated resource unit is not mixed with a resource unit for data transmission, that is, the dedicated resource unit is only configured to transmit the broadcast-type signals and channels, and is not included in an internal of a resource block for data transmission, for example, the dedicated resource unit is not a resource unit within a subframe or a resource unit within a Transmission Time Interval (TTI).

Thus, in the method for controlling the user equipment according to the embodiments of the present disclosure, since service data is not mixed with the broadcast-type signals and channels by using the dedicated resource unit, the service data does not require complicated rate matching, which can reduce system complexity. After receiving information in a resource block, the user equipment does not need to distinguish and match the data, and does not need to distinguish whether the information in the resource block is control information or the service data, therefore the user equipment can directly demodulate and decode data, and efficiency of the user equipment can be improved.

In an embodiment of the present disclosure, the dedicated resource unit may include a subframe or a transmission time interval in the time domain. Both the subframe and the transmission time interval can be considered as a minimum resource unit capable of independently decoding. It is understood that, the dedicated resource unit may be at least an resource unit that can independently decode, and the specific resource included in the dedicated resource unit may also be other resource units that are identical or similar to the subframe or the transmission time interval.

Since different subbands may have different configurations in 5G system, in order that all user equipments supported by the system can recognize the broadcast-type signals and channels, it is possible to transmit the broadcast-type signals and channels by using a preset configuration.

In some embodiments, the dedicated resource unit may be any subband within a bandwidth resource, and the user equipment accessing a network may be accessing a subband where the dedicated resource unit is located.

In some embodiments, transmitting the broadcast-type signals and channels to the user equipment may include: transmitting the broadcast-type signals and channels to the user equipment according to a preset basic carrier configuration, so that user equipments of different kinds can recognize the broadcast-type signals and channels.

Wherein the basic carrier configuration may include a subcarrier spacing and a cyclic prefix length.

Similarly, in another embodiment, transmitting the broadcast-type signals and channels to the user equipment may further include: transmitting the broadcast-type signals and channels to the user equipment according to a predetermined basic waveform configuration. Wherein the basic waveform configuration includes a multi-carrier/single-carrier waveform, for example, an Orthogonal Frequency Division Multiplexing (OFDM) waveform, a Discrete Fourier Transform spread Orthogonal Frequency Division Multiplexing (DFT-s-OFDM) waveform or other variant waveforms.

Similarly, in another embodiment, a transmission format and/or a transmission mode of the broadcast-type signals and channels are a predefined transmission format and/or a predefined transmission mode respectively. Since there are different transmission formats and/or transmission modes in a multi-antenna system, it is convenient for the user equipment to detect the broadcast-type signals and channels by using a preset transmission format and/or a preset transmission mode.

In some embodiments, the broadcast-type signals and channels may include at least one of a synchronization signal, a broadcast channel and a common control channel.

Wherein the synchronization signal is used by a user to search for a cell and is initially synchronized to the cell from which the synchronization signal is transmitted through a downlink process; the broadcast channel is configured to provide basic information of the cell such as antenna number, bandwidth and frame number etc. to the user; and the common control channel is configured to schedule the user to decode the system information, paging information and random access feedback information.

It is understood that embodiments of the synchronization signal, the broadcast channel and the common control channel only need to meet the above requirements and may be the same or similar to a synchronization signal, a broadcast channel, and a common control channel in a conventional system, but is not limited thereto.

In an embodiment of the present disclosure, the network side may transmit a synchronization signal and a broadcast channel through each dedicated resource unit, but the common control channel is scheduled by the network side as required. The network side may transmit the synchronization signal and/or broadcast channel on time-frequency resources of the common control channel as required. If the user equipment cannot blindly detect the common control channel, the synchronization signal and/or the broadcast channel may be received according to a predefined rule.

In another embodiment, transmitting the broadcast channel and/or the common control channel through the dedicated resource unit may include: transmitting the broadcast channel and/or the common control channel to the user equipment by using a preset broadcast reference signal. The broadcast reference signal may be not only applied to demodulate a reference signal required by the broadcast channel and/or the common control channel, but also applied for the user equipment to perform time and frequency offset tracking.

Wherein a time-frequency resource location occupied by the broadcast reference signal and a corresponding complex value (a plurality of complex values constitute a sequence) may be predefined and predictable by all user equipments.

In a non-limiting embodiment, a network side may transmit a broadcast reference signal, and a user equipment may utilize the broadcast reference signal for time and frequency offset tracking and/or channel estimation.

In another non-limiting embodiment, the broadcast reference signal is only present in the dedicated resource unit, rather than evenly distributed in all time-frequency locations within the bandwidth resource, which can save time-frequency resources.

In some embodiments, the broadcast-type signals and channels may include a plurality of signals and/or channels, and the plurality of signals and/or channels located in a same dedicated resource unit are independently encoded and modulated, so that the user equipment can independently demodulate and decode the plurality of signals and/or channels located in the same dedicated resource unit.

For example, the broadcast-type signals and channels may include a synchronization signal, a broadcast channel and a common control channel, wherein the synchronization signal, the broadcast channel and the common control channel may be independently encoded and modulated. Thus, the user equipment can demodulate and decode the synchronization signal, the broadcast channel and the common control channel independently, so that the synchronization signal or the broadcast channel and the common control channel can be demodulated and decoded independently as necessary to improve flexibility of the user equipment and efficiency.

In an embodiment of the present disclosure, the broadcast-type signals and channels transmitted by the network side through the dedicated resource unit may include a plurality of signals and/or channels, and there is a sequence among the plurality of signals and/or channels located in a same dedicated resource unit in the time domain.

Figure 2:
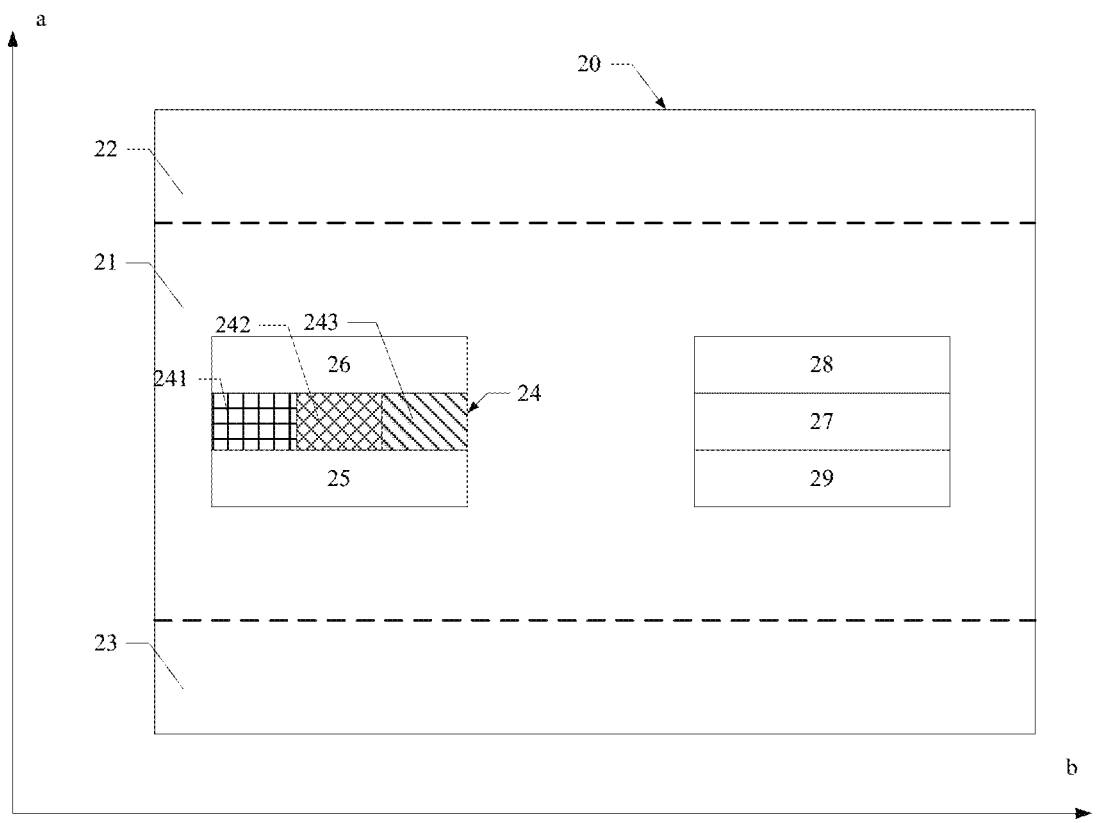
FIG. 2 schematically illustrates a resource allocation diagram according to an embodiment of the present disclosure.

For example, the broadcast-type signals and channels transmitted by the network side through the dedicated resource unit may include a synchronization signal, a broadcast channel and a common control channel, and the synchronization signal, the broadcast channel and the common control channel are sequentially arranged in the dedicated resource unit in the time domain as shown in FIG. 2.

In FIG. 2, a direction indicates a frequency domain and b direction indicates a time domain. A bandwidth resource 20 schematically illustrates an available bandwidth resource within a time domain range. The bandwidth resource 20 may be divided into a plurality of subbands, and three subbands are shown in FIG. 2 including a subband 21, a subband 22 and a subband 23. It is understood that although only three subbands are shown in FIG. 2, the actual number of subbands is not limited thereto.

A synchronization signal 241, a broadcast channel 242 and a common control signal 243 are located in a same dedicated resource unit 24 which is located in the subband 21 within the bandwidth resource. It is understood that, a time domain length and a frequency domain width in FIG. 2 are only illustrative and do not represent actual scale.

In some embodiments, transmitting the broadcast-type signals and channels to the user equipment through the dedicated resource unit may include: transmitting the broadcast-type signals and channels repeatedly in a plurality of the dedicated resource unit of different time domain positions and/or different frequency domain positions.

As shown in FIG. 2, the broadcast-type signals and channels may be repeatedly transmitted in a resource region 26 or a resource region 25, which has a same time domain position and different frequency domain positions compared with the dedicated resource unit 24 in the subband 21, or may be repeatedly transmitted in a resource region 27, a resource region 28 or a resource region 29 in the subband 21, wherein the resource region 27, the resource region 28 and the resource region 29 have different time domain positions and a same frequency domain position compared with the dedicated resource unit 24, the resource region 26 and the resource region 25 respectively, or may be repeatedly transmitted in other subbands other than the subband 21, such as in resource regions at a same time domain position, or in resource regions at different time domain positions.

Although the broadcast-type signals and channels included in each dedicated resource unit can independently support the user equipment to access to the network, there may be a certain probability of failure during the user equipment acquiring the broadcast-type signals and channels included in the dedicated resource unit, thus the user equipment may have multiple opportunities to acquire the broadcast-type signals and channels by transmitting the broadcast-type signals and channels repeatedly in a plurality of the dedicated resource unit of different time domain positions and/or different frequency domain positions, to ensure the successful access of the user equipment.

The user equipment may only receive the dedicated resource unit 24, for example, when a narrowband device has a same bandwidth as the dedicated resource unit; while a user equipment having a wide bandwidth may also receive the dedicated resource unit 24, the dedicated resource unit 25 and the dedicated resource unit 26 simultaneously, such that the success probability of acquiring the broadcast-type of signals and channels can be improved in a short time period, and the access efficiency is enhanced.

In some embodiments, the user equipment in the method according to the embodiments of the present disclosure may be different kinds of user equipment, such as any of an enhanced mobile broadband user equipment, a large-scale machine-type communication user equipment and a high reliability and low latency communication user equipment.

Since different kinds of user equipment may require broadcast-type signals and channels of different contents, in an embodiment of the present disclosure, the method may further include S12 (referring to FIG. 1) of dividing the dedicated resource unit into a plurality of dedicated resource subunits according to the different kinds of user equipment. Wherein transmitting the broadcast-type signals and channels to the user equipment through the dedicated resource unit may include transmitting the different kinds of broadcast-type signals and channels through the plurality of dedicated resource subunits, and each of the plurality of dedicated resource subunits is independently encoded and modulated.

Wherein the plurality of dedicated resource subunits may be acquired by dividing each dedicated resource unit only in the frequency domain, or by dividing each dedicated resource unit only in the time domain, or by dividing each dedicated resource unit simultaneously in the frequency domain and the time domain. Embodiments of division of the dedicated resource unit can be selected as needed.

Dividing the dedicated resource unit into a plurality of dedicated resource subunits according to the different kinds of user equipment, transmitting the different kinds of broadcast-type signals and channels through the plurality of dedicated resource subunits, and each of the dedicated resource subunits is independently encoded and modulated, thus the different kinds of user equipment can perform targeted detection, demodulation and decoding so as to save resources of the user equipment and improve access efficiency.

In another embodiment of the present disclosure, the user equipment may include different kinds of user equipments, the different kinds of user equipment correspond to broadcast-type signals and channels of different contents, and the different kinds of broadcast-type signals and channels in the dedicated resource unit may be encoded and modulated in hybrid. By interleaved and hybrid coding, a larger coding gain can be obtained.

Referring to FIG. 1, the method according to the embodiments of the present disclosure may further include a step S13 of instructing the user equipment to perform configuration for different subbands through the dedicated resource unit.

In some embodiments, the configuration may be performed by using a common control channel in a dedicated resource unit. Accessing the network in step S11 is to access a subband where the dedicated resource unit is located, and after the access the user can be instructed, through the subband where the dedicated resource unit is located, to perform configuration for other subbands, so that the user equipment can process business in all subbands within the bandwidth range according to scheduling of the network side.

Figure 3:
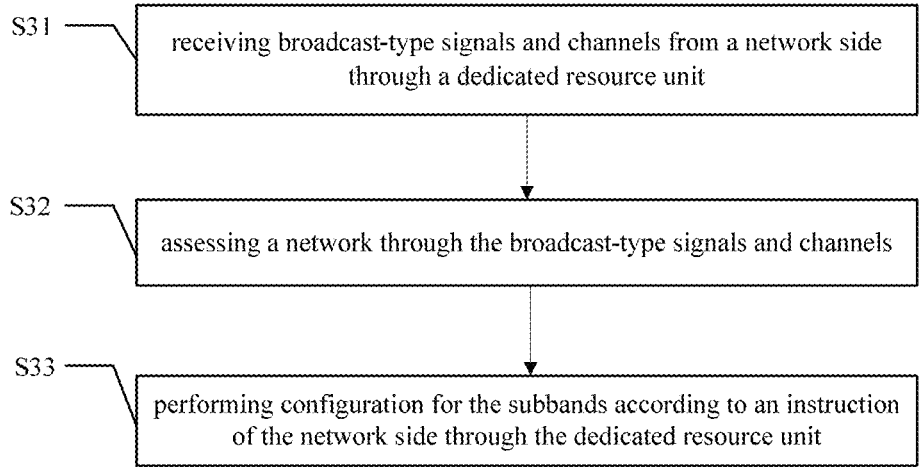
FIG. 3 schematically illustrates a flow chart of a method for controlling a user equipment according to another embodiment of the present disclosure.

A method for controlling the user equipment is also provided according to an embodiment of the present disclosure, and a flow chart of the method is shown in FIG. 3. The method for controlling the user equipment shown in FIG. 3 may be applied to a user equipment side, and may include:

in step S31, receiving broadcast-type signals and channels from a network side through a dedicated resource unit; and in step S32, accessing a network through the broadcast-type signals and channels;

wherein the dedicated resource unit is only configured to transmit the broadcast-type signals and channels, and is continuous in a frequency domain and a time domain.

In some embodiments, the dedicated resource unit may include a subframe or a transmission time interval in the time domain.

In some embodiments, a time domain position and a frequency domain position of the dedicated resource unit are a predefined time domain position and a predefined frequency domain position respectively.

In some embodiments, receiving the broadcast-type signals and channels from the network side through the dedicated resource unit includes receiving the broadcast-type signals and channels according to a preset basic carrier configuration.

Wherein the basic carrier configuration includes a subcarrier spacing and a cyclic prefix length.

In an embodiment of the present disclosure, receiving the broadcast-type signals and channels from the dedicated resource unit on the network side may further include receiving the broadcast-type signals and channels according to a preset basic waveform configuration.

Wherein the basic waveform configuration includes a multi-carrier/single-carrier waveform, for example, an Orthogonal Frequency Division Multiplexing (OFDM) waveform, a Discrete Fourier Transform spread Orthogonal Frequency Division Multiplexing (DFT-s-OFDM) waveform, or other variant waveforms.

In some embodiments, the broadcast-type signals and channels may include at least one of a synchronization signal, a broadcast channel and a common control channel.

In some embodiments, when the broadcast-type signals and channels include a synchronization signal, a broadcast channel and a common control channel, receiving the broadcast-type signals and channels from the dedicated resource unit in the network side may include: receiving the broadcast channel and/or the common control channel by using a preset broadcast reference signal.

In some embodiments, receiving the broadcast-type signals and channels from the dedicated resource unit in the network side may include receiving the broadcast channel and/or the common control channel by using a preset broadcast reference signal, and accessing the network may include using the broadcast reference signal for time and frequency offset tracking and/or channel estimation.

In some embodiments, when the broadcast-type signals and channels include a synchronization signal, a broadcast channel and a common control channel, the broadcast reference signal may only be present in the dedicated resource unit.

In some embodiments, receiving the broadcast-type signals and channels from the dedicated resource unit in the network side may include receiving the broadcast-type signals and channels repeatedly from a plurality of the dedicated resource unit of different time domain positions and/or different frequency domain positions.

In some embodiments, when the broadcast-type signals and channels include a plurality of signals and/or channels, and the plurality of signals and/or channels located in a same dedicated resource unit are independently encoded and modulated, accessing the network through the broadcast-type signals and channels includes demodulating and decoding the plurality of signals and/or channels located in the same dedicated resource unit independently.

In some embodiments, the broadcast-type signals and channels include a plurality of signals and/or channels, and accessing the network through the broadcast-type signals and channels may include: processing the plurality of signals and/or channels located in a same dedicated resource unit sequentially according to a sequence of the plurality of signals and/or channels located in the same dedicated resource unit in the time domain.

Figure 4:
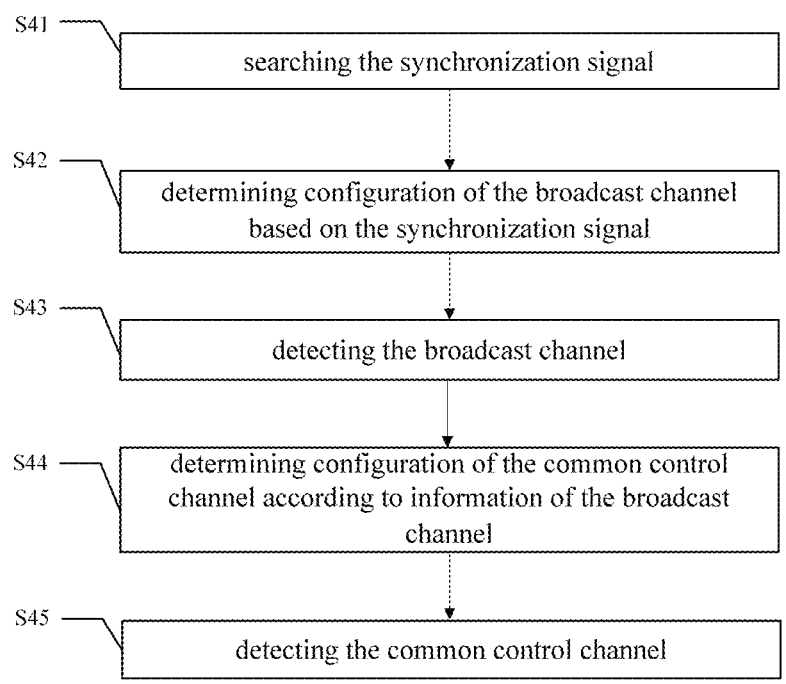
FIG. 4 schematically illustrates a flow chart of a user equipment processing the plurality of signals and/or channels located in a same dedicated resource unit sequentially according to an embodiment of the present disclosure.

Referring to FIG. 4, in an embodiment of the present disclosure, the broadcast-type signals and channels include at least one of a synchronization signal, a broadcast channel and a common control channel; and processing the plurality of signals and/or channels located in a same dedicated resource unit sequentially according to a sequence of the plurality of signals and/or channels located in the same dedicated resource unit in the time domain may include:

in step S41, searching the synchronization signal;

in step S42, determining configuration of the broadcast channel based on the synchronization signal;

in step S43, detecting the broadcast channel;

in step S44, determining configuration of the common control channel according to information of the broadcast channel; and in step S45, detecting the common control channel.

In some embodiments, the broadcast-type signals and channels include different kinds of broadcast-type signals and channels to be adapted for at least one equipment selected from a group consisting of an enhanced mobile broadband user equipment, a large-scale machine-type communication user equipment and a high reliability and low latency communication user equipment.

In some embodiments, the broadcast-type signals and channels include different broadcast-type signals respectively corresponding to different kinds of user equipment, the dedicated resource unit is divided into a plurality of dedicated resource subunits according to the different kinds of user equipment, different kinds of broadcast-type signals and channels are transmitted through the plurality of dedicated resource subunits, and each of the plurality of dedicated resource subunits is independently encoded and modulated.

Wherein accessing the network through the broadcast-type signals and channels includes decoding and demodulating each of the plurality of dedicated resource subunits independently.

In some embodiments, the broadcast-type signals and channels may include different kinds of broadcast-type signals and channels respectively corresponding to different kinds of user equipment, and the dedicated resource unit performs coding and modulation in hybrid to the different kinds of broadcast-type signals and channels.

In some embodiments, a transmission format and/or a transmission mode of the broadcast-type signals and channels may be a predefined transmission format and/or a predefined transmission mode respectively.

In some embodiments, the method for controlling the user equipment as shown in FIG. 3 may further include a step S33 of performing configuration for the subbands according to an instruction of the network side through the dedicated resource unit.

The method for controlling the user equipment shown in FIG. 3 corresponds to the method for controlling the user equipment shown in FIG. 1, and embodiments and beneficial effects of the method for controlling the user equipment shown in FIG. 3 can be referred to the method for controlling the user equipment shown in FIG. 1, which is not described herein.

Figure 5:
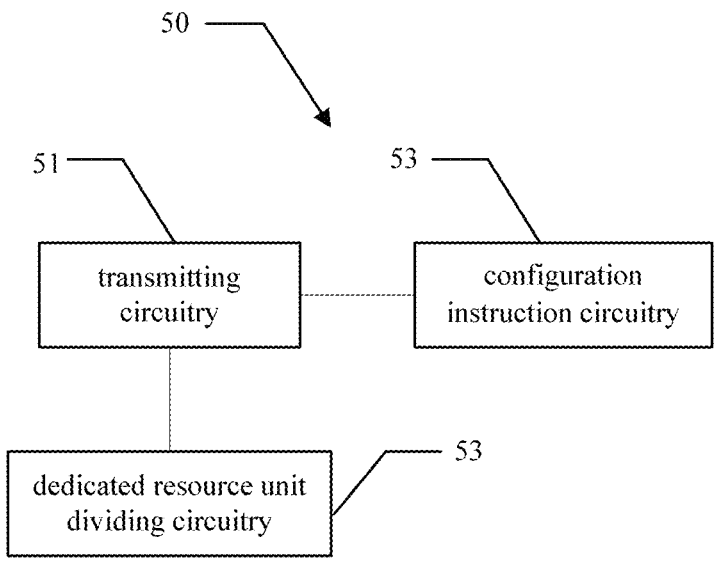
FIG. 5 schematically illustrates a structural diagram of a network side device according to an embodiment of the present disclosure.

A network side device is also provided according to an embodiment of the present disclosure, and FIG. 5 schematically illustrates a structural diagram of the network side device.

A network side device 50 may include a transmitting circuitry 51 configured to transmit broadcast-type signals and channels to a user equipment through a dedicated resource unit so that the user equipment can access a network; wherein the dedicated resource unit is only configured to transmit the broadcast-type signals and channels, and is continuous in a frequency domain and a time domain.

In some embodiments, the dedicated resource unit may include a subframe or a transmission time interval in the time domain.

In some embodiments, a time domain position and a frequency domain position of the dedicated resource unit are a predefined time domain position and a predefined frequency domain position respectively.

In some embodiments, the transmitting circuitry 51 is configured to transmit the broadcast-type signals and channels to the user equipment according to a preset basic carrier configuration, so that user equipments of different kinds can recognize the broadcast-type signals and channels.

In some embodiments, the basic carrier configuration includes a subcarrier spacing and a cyclic prefix length.

Similarly, in some embodiments, the transmitting circuitry 51 is configured to transmit the broadcast-type signals and channels to the user equipment according to a predetermined basic waveform configuration.

Wherein the basic waveform configuration includes a multi-carrier/single-carrier waveform, for example, an Orthogonal Frequency Division Multiplexing (OFDM) waveform, a Discrete Fourier Transform spread Orthogonal Frequency Division Multiplexing (DFT-s-OFDM) waveform or other variant waveforms.

In some embodiments, the broadcast-type signals and channels include at least one of a synchronization signal, a broadcast channel and a common control channel.

In some embodiments, the transmitting unit 51 is configured to transmit the broadcast channel and/or the common control channel to the user equipment by using a preset broadcast reference signal.

In some embodiments, the transmitting unit 51 may transmit the broadcast reference signal, and the user equipment may utilize the broadcast reference signal for time and frequency offset tracking and/or channel estimation.

In some embodiments, the broadcast reference signal may only be present in the dedicated resource unit.

In some embodiments, the transmitting circuitry 51 is configured to transmit the broadcast-type signals and channels repeatedly in a plurality of the dedicated resource unit of different time domain positions and/or different frequency domain positions.

In some embodiments, the broadcast-type signals and channels may include a plurality of signals and/or channels, and the plurality of signals and/or channels located in a same dedicated resource unit are independently encoded and modulated, so that the user equipment can independently demodulate and decode the plurality of signals and/or channels located in the same dedicated resource unit.

In some embodiments, the broadcast-type signals and channels include a plurality of signals and/or channels, and there is a sequence among the plurality of signals and/or channels located in a same dedicated resource unit in the time domain.

In some embodiments, the broadcast-type signals and channels may include a synchronization signal, a broadcast channel and a common control channel, and the synchronization signal, the broadcast channel and the common control channel are arranged sequentially in the dedicated resource unit in the time domain.

In some embodiments, the user equipment may be any of an enhanced mobile broadband user equipment, a large-scale machine-type communication user equipment and a high reliability and low latency communication user equipment.

In some embodiments, the user equipment may include different kinds of user equipment, the different kinds of user equipment correspond to different kinds of broadcast-type signals and channels, and the network side device may further include: a dedicated resource unit dividing circuitry 52 configured to divide the dedicated resource unit into a plurality of dedicated resource subunits according to the different kinds of user equipment; and the transmitting circuitry is configured to transmit the different kinds of broadcast-type signals and channels through the plurality of dedicated resource subunits, wherein each of the plurality of dedicated resource subunits is independently encoded and modulated.

In some embodiments, the user equipment may include different kinds of user equipment, the different kinds of user equipment correspond to different kinds of broadcast-type signals and channels, and the different kinds of broadcast-type signals and channels in the dedicated resource unit are encoded and modulated in hybrid.

In some embodiments, a transmission format and/or a transmission mode of the broadcast-type signals and channels are a predefined transmission format and/or a predefined transmission mode respectively.

In some embodiments, the network side device 50 may further include a configuration instruction circuitry 53 configured to instruct the user equipment to perform configuration for different subbands through the dedicated resource unit.

The network side device shown in FIG. 5 corresponds to the method for controlling the user equipment shown in FIG. 1, and embodiments and beneficial effects of the user equipment shown in FIG. 5 can be referred to the method for controlling the user equipment shown in FIG. 1, which will not be described herein.

Figure 6:
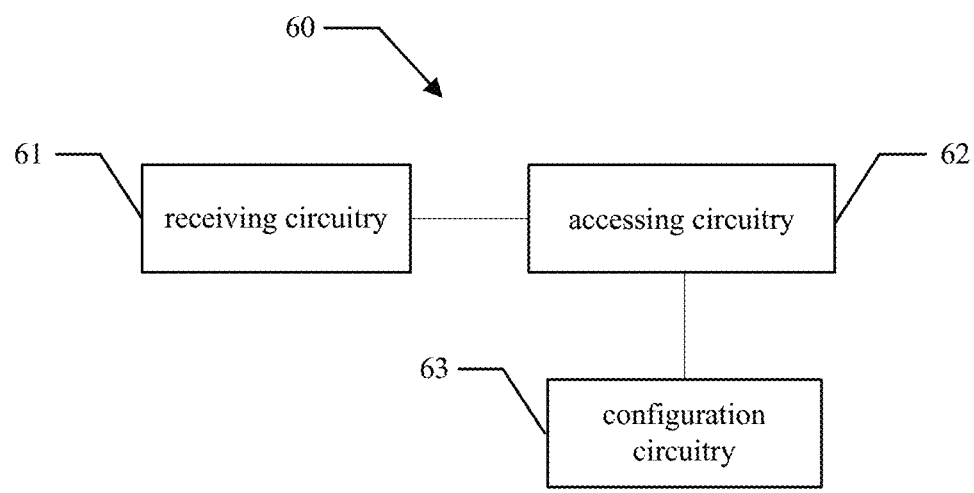
FIG. 6 schematically illustrates a structural diagram of a user equipment according to an embodiment of the present disclosure.

A user equipment is also provided according to an embodiment of the present disclosure, and a structural diagram of the user equipment is schematically illustrated in FIG. 6.

A user equipment 60 may include:

a receiving circuitry 61, configured to receive broadcast-type signals and channels from a network side through a dedicated resource unit; and an accessing circuitry 62, configured to access a network through the broadcast-type signals and channels;

wherein the dedicated resource unit is only configured to transmit the broadcast-type signals and channels, and is continuous in a frequency domain and a time domain.

In some embodiments, the dedicated resource unit may include a subframe or a transmission time interval in the time domain.

In some embodiments, a time domain position and a frequency domain position of the dedicated resource unit are a predefined time domain position and a predefined frequency domain position respectively.

In some embodiments, the receiving circuitry 61 is configured to receive the broadcast-type signals and channels according to a preset basic carrier configuration.

In some embodiments, the basic carrier configuration includes a subcarrier spacing and a cyclic prefix length.

Similarly, in some embodiments, the receiving circuitry 61 is further configured to receive the broadcast-type signals and channels according to a preset basic waveform configuration.

Wherein the basic waveform configuration includes a multi-carrier/single-carrier waveform, for example, an Orthogonal Frequency Division Multiplexing (OFDM) waveform, a Discrete Fourier Transform spread Orthogonal Frequency Division Multiplexing (DFT-s-OFDM) waveform, or other variant waveforms.

In some embodiments, the broadcast-type signals and channels may include at least one of a synchronization signal, a broadcast channel and a common control channel.

In some embodiments, the accessing circuitry 62 is configured to using the broadcast reference signal for time and frequency offset tracking and/or channel estimation.

In some embodiments, the broadcast reference signal is present only in the dedicated resource unit.

In some embodiments, the receiving circuitry 61 is configured to receive the broadcast-type signals and channels repeatedly from a plurality of the dedicated resource unit of different time domain positions and/or different frequency domain positions.

In some embodiments, the broadcast-type signals and channels include a plurality of signals and/or channels, the plurality of signals and/or channels located in a same dedicated resource unit are independently encoded and modulated, and the accessing circuitry is configured to demodulate and decode the plurality of signals and/or channels located in the same dedicated resource unit independently.

In some embodiments, the broadcast-type signals and channels include a plurality of signals and/or channels, and the accessing circuitry 62 is configured to process the plurality of signals and/or channels located in a same dedicated resource unit sequentially according to a sequence of the plurality of signals and/or channels located in the same dedicated resource unit in the time domain.

Figure 7:
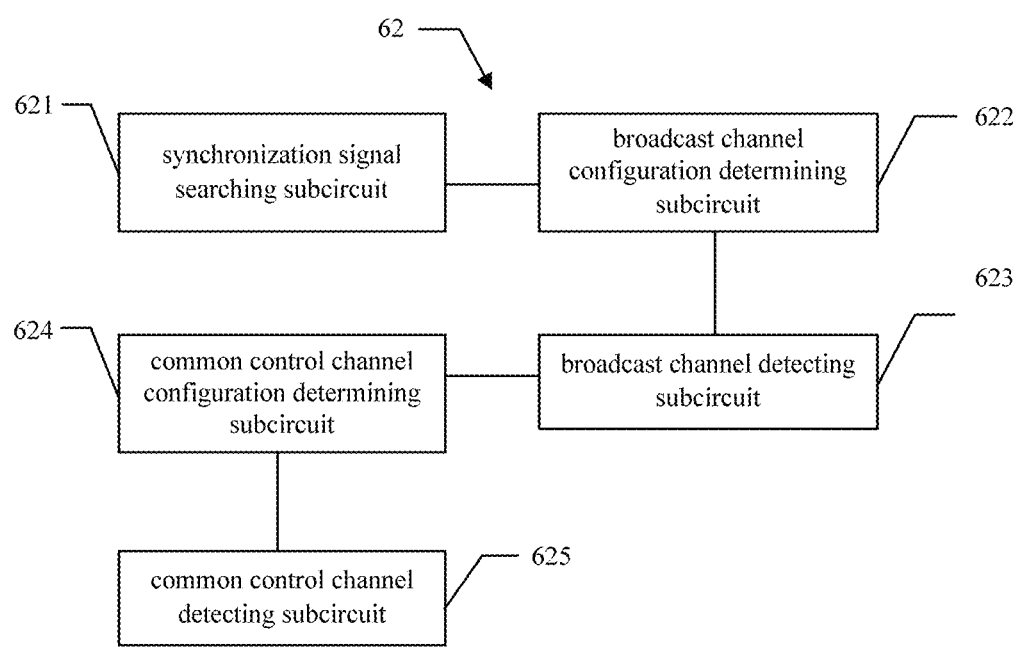
FIG. 7 schematically illustrates a structural diagram of an access circuitry according to an embodiment of the present disclosure.

Referring to FIG. 7, in some embodiments, the accessing circuitry 62 may include:

a synchronization signal searching subcircuit 621, configured to search a synchronization signal;

a broadcast channel configuration determining subcircuit 622, configured to determine configuration of the broadcast channel based on the synchronization signal;

a broadcast channel detecting subcircuit 623, configured to detect the broadcast channel;

a common control channel configuration determining subcircuit 624, configured to determine configuration of the common control channel according to information of the broadcast channel; and a common control channel detecting subcircuit 625, configured to detect the common control channel.

In some embodiments, the broadcast-type signals and channels include different kinds of broadcast-type signals and channels to be adapted for at least one equipment selected from a group consisting of an enhanced mobile broadband user equipment, a large-scale machine-type communication user equipment and a high reliability and low latency communication user equipment.

Referring to FIG. 6, in some embodiments, the broadcast-type signals and channels include different kinds of broadcast-type signals and channels respectively corresponding to different kinds of user equipment, the dedicated resource units are divided into a plurality of dedicated resource subunits according to the different kinds of user equipment, different kinds of broadcast-type signals and channels are transmitted through the plurality of dedicated resource subunits, and each of the plurality of dedicated resource subunits is independently encoded and modulated; and the accessing circuitry 61 is configured to decode and demodulate each of the plurality of dedicated resource subunits independently.

In some embodiments, the broadcast-type signals and channels include different kinds of broadcast-type signals and channels respectively corresponding to different kinds of user equipment, and the dedicated resource unit performs encoding and modulation in hybrid to the different kinds of broadcast-type signals and channels.

In some embodiments, a transmission format and/or a transmission mode of the broadcast-type signals and channels are a predefined transmission format and/or a predefined transmission mode respectively.

In some embodiments, the user equipment 60 may further include a configuration circuitry 63, configured to perform configuration for subbands according to an instruction of a network side through a dedicated resource unit.

The user equipment shown in FIG. 6 corresponds to the method for controlling the user equipment shown in FIG. 3, and embodiments and beneficial effects of the user equipment shown in FIG. 6 can be referred to the method for controlling the user equipment shown in FIG. 3, which will not be described herein.

It will be appreciated by those of ordinary skill in the art that all or a portion of the steps in the various methods of the embodiments described above may be performed by a program that instructs the associated hardware to be stored in a computer-readable storage medium which may include ROM, RAM, magnetic disk, or optical disk.

Although the present invention has been described above, the present invention is not limited to thereto. It should be understood by those skilled in the art that various changes and modifications may be made without departing from the spirit and scope of the invention, and it is therefore intended that the scope of protection of the invention be defined by the claims.

What is claimed is:

1. A method for controlling a user equipment, comprising:
   transmitting broadcast-type signals and channels to the user equipment through a dedicated resource unit to make the user equipment access a network and use a preset broadcast reference signal for time and frequency offset tracking, wherein the broadcast-type signals and channels comprise a synchronization signal, a broadcast channel and the preset broadcast reference signal, and the preset broadcast reference signal is used for decoding the broadcast channel;

wherein the dedicated resource unit is only configured to transmit the broadcast-type signals and channels, and is continuous in a frequency domain and a time domain.

2. The method for controlling the user equipment according to claim 1, wherein the dedicated resource unit comprises a subframe or a transmission time interval in the time domain.

3. The method for controlling the user equipment according to claim 1, wherein a time domain position and a frequency domain position of the dedicated resource unit are a predefined time domain position and a predefined frequency domain position respectively.

4. The method for controlling the user equipment according to claim 1, wherein transmitting the broadcast-type signals and channels to the user equipment comprises: transmitting the broadcast-type signals and channels to the user equipment according to a preset basic carrier configuration to make user equipments of different kinds can recognize the broadcast-type signals and channels.

5. The method for controlling the user equipment according to claim 4, wherein the basic carrier configuration comprises: a subcarrier spacing and a cyclic prefix length.

6. The method for controlling the user equipment according to claim 1, wherein transmitting the broadcast-type signals and channels through the dedicated resource unit comprises: transmitting the broadcast channel to the user equipment by using the preset broadcast reference signal.

7. The method for controlling the user equipment according to claim 1, wherein transmitting the broadcast-type signals and channels to the user equipment through the dedicated resource unit comprises: transmitting the broadcast-type signals and channels repeatedly in a plurality of the dedicated resource unit of different time domain positions and/or different frequency domain positions.

8. The method for controlling the user equipment according to claim 1, wherein the broadcast-type signals and channels comprise a plurality of signals and/or channels, and there is a sequence among the plurality of signals and/or channels located in a same dedicated resource unit in the time domain.

9. A method for controlling a user equipment, comprising:
receiving broadcast-type signals and channels from a network side through a dedicated resource unit, wherein the broadcast-type signals and channels comprise a synchronization signal, a broadcast channel and a preset broadcast reference signal; and
accessing a network through the broadcast-type signals and channels, and using the preset broadcast reference signal for time and frequency offset tracking and for decoding the broadcast channel;
wherein the dedicated resource unit is only configured to transmit the broadcast-type signals and channels, and is continuous in a frequency domain and a time domain, and the broadcast-type signals and channels comprise a synchronization signal and a broadcast channel.

10. The method for controlling the user equipment according to claim 9, wherein the dedicated resource unit comprises a subframe or a transmission time interval in the time domain.

11. The method for controlling the user equipment according to claim 9, wherein a time domain position and a frequency domain position of the dedicated resource unit are a predefined time domain position and a predefined frequency domain position respectively.

12. The method for controlling the user equipment according to claim 9, wherein receiving the broadcast-type signals and channels from the network side through the dedicated resource unit comprises: receiving the broadcast-type signals and channels according to a preset basic carrier configuration.

13. The method for controlling the user equipment according to claim 12, wherein the basic carrier configuration comprises a subcarrier spacing and a cyclic prefix length.

14. The method for controlling the user equipment according to claim 9, wherein receiving the broadcast-type signals and channels from the network side through the dedicated resource unit comprises: receiving the broadcast channel by using the preset broadcast reference signal.

15. The method for controlling the user equipment according to claim 9, wherein receiving the broadcast-type signals and channels from the network side through the dedicated resource unit comprises: receiving the broadcast-type signals and channels repeatedly from a plurality of the dedicated resource unit of different time domain positions and/or different frequency domain positions.

16. The method for controlling the user equipment according to claim 9, wherein the broadcast-type signals and channels comprise a plurality of signals and/or channels, the plurality of signals and/or channels located in a same dedicated resource unit are independently encoded and modulated, and accessing the network through the broadcast-type signals and channels comprises demodulating and decoding the plurality of signals and/or channels located in the same dedicated resource unit independently.

17. The method for controlling the user equipment according to claim 9, wherein the broadcast-type signals and channels comprise a plurality of signals and/or channels, and accessing the network through the broadcast-type signals and channels comprises: processing the plurality of signals and/or channels located in a same dedicated resource unit sequentially according to a sequence of the plurality of signals and/or channels located in the same dedicated resource unit in the time domain.

18. The method for controlling the user equipment according to claim 17, wherein processing the plurality of signals and/or channels located in the same dedicated resource unit sequentially according to the sequence of the plurality of signals and/or channels located in the same dedicated resource unit in the time domain comprises:
searching the synchronization signal;
determining configuration of the broadcast channel based on the synchronization signal; and
detecting the broadcast channel.

19. The method for controlling the user equipment according to claim 9, wherein the broadcast-type signals and channels comprise different kinds of broadcast-type signals and channels respectively corresponding to different kinds of user equipment, the dedicated resource unit is divided into a plurality of dedicated resource subunits according to the different kinds of user equipment, the different kinds of broadcast-type signals and channels are transmitted through the plurality of dedicated resource subunits, and each of the plurality of dedicated resource subunits is independently encoded and modulated; and
accessing the network through the broadcast-type signals and channels comprises decoding and demodulating each of the plurality of dedicated resource subunits independently.

20. The method for controlling the user equipment according to claim 9, wherein the broadcast-type signals and channels comprise different kinds of broadcast-type signals and channels respectively corresponding to different kinds of user equipment, and the dedicated resource unit performs encoding and modulation in hybrid to the different kinds of broadcast-type signals and channels.

* * * * *